United States Patent
Nashimoto

(10) Patent No.: US 12,259,966 B2
(45) Date of Patent: Mar. 25, 2025

(54) PROGRAM PROCESSING DEVICE AND PROGRAM PROCESSING METHOD THAT EXECUTES A MASK PROCESS ON AN ENTRY ADDRESS USED BY AN APPLICATION PROGRAM

(71) Applicant: Mitsubishi Electric Corporation, Tokyo (JP)

(72) Inventor: Shoei Nashimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 35 days.

(21) Appl. No.: 18/214,020

(22) Filed: Jun. 26, 2023

(65) Prior Publication Data

US 2023/0334149 A1    Oct. 19, 2023

Related U.S. Application Data

(63) Continuation of application No. PCT/JP2021/006409, filed on Feb. 19, 2021.

(51) Int. Cl.
G06F 21/54    (2013.01)

(52) U.S. Cl.
CPC .................... *G06F 21/54* (2013.01)

(58) Field of Classification Search
CPC .......... G06F 21/54; G06F 12/14; G06F 21/12; G06F 21/14; G06F 21/52; G06F 21/79
See application file for complete search history.

(56) References Cited

U.S. PATENT DOCUMENTS

2003/0217277 A1*  11/2003  Narayanan ..........  G06F 11/2284
                                                                       726/22
2011/0289294 A1   11/2011  Maeda et al.
(Continued)

FOREIGN PATENT DOCUMENTS

EP    2515239 A1    10/2012
JP    51-3745 A     1/1976
(Continued)

OTHER PUBLICATIONS

International Search Report, issued in PCT/JP2021/006409, PCT/ISA/210, dated May 11, 2021.
(Continued)

*Primary Examiner* — Michael Krofcheck
(74) *Attorney, Agent, or Firm* — Birch, Stewart, Kolasch & Birch, LLP

(57) ABSTRACT

A program processing device (100) includes: an entry address masking unit (110) to generate a fake entry address, which is obtained by masking an entry address with the use of a save value copied from a setting value stored in a storage, and to replace an entry address used by an application program with the fake entry address; a memory monitoring unit (111) to determine whether the fake entry address is loaded during execution of the application program; and an entry address unmasking unit (112) to generate a new entry address, which is obtained by loading the setting value from the storage and unmasking the fake entry address with the use of the setting value, and to replace the fake entry address with the new entry address, when the fake entry address is loaded.

14 Claims, 12 Drawing Sheets

(56) References Cited

U.S. PATENT DOCUMENTS

| | | | |
|---|---|---|---|
| 2016/0094552 A1* | 3/2016 | Durham | G06F 21/00 713/171 |
| 2017/0046280 A1* | 2/2017 | Driessen | G06F 12/1408 |
| 2019/0227724 A1 | 7/2019 | Schaefer et al. | |

FOREIGN PATENT DOCUMENTS

| | | |
|---|---|---|
| JP | 2005-165919 A | 6/2005 |
| JP | 2009-110113 A | 5/2009 |
| JP | 2010-186386 A | 8/2010 |
| JP | 2019-535093 A | 12/2019 |
| WO | WO 2011/074168 A1 | 6/2011 |

OTHER PUBLICATIONS

Nashimoto et al., "Bypassing Isolated Execution on RISC-V with Fault Injection", Cryptology ePrint Archive, Report 2020/1193, 2020(posted Sep. 30, 2020), total 30 pages.
Notice of Reasons for Refusal for Japanese Application No. 2021-544438 dated Oct. 5, 2021.

* cited by examiner

PROGRAM PROCESSING DEVICE AND PROGRAM PROCESSING METHOD THAT EXECUTES A MASK PROCESS ON AN ENTRY ADDRESS USED BY AN APPLICATION PROGRAM

CROSS REFERENCE TO RELATED APPLICATIONS

This application is a Continuation of PCT International Application No. PCT/JP2021/006409 filed on Feb. 19, 2021, which is hereby expressly incorporated by reference into the present application.

TECHNICAL FIELD

The present disclosure relates to a program processing device, a program processing method, and a program.

BACKGROUND ART

Trusted Execution Environment (TEE) is a secure execution environment that uses a memory protection mechanism of a processor to control access between applications. For example, even if a vulnerability is found in a library or application, it is possible to prevent the impact of the vulnerability from propagating to a security-critical application by executing the security-critical application in a secure execution environment.

TEE is a mechanism to prevent attacks by software. However, a risk of physical attacks has been pointed out in TEE environments in physically accessible devices such as embedded devices. Non-Patent Literature 1 discloses that memory access that is not normally permitted is enabled by a physical attack method called a fault injection attack which disables access privilege settings of memory protection mechanisms.

CITATION LIST

Non-Patent Literature

Non-Patent Literature 1: Nashimoto, Shoei, et al. "Bypassing Isolated Execution on RISC-V with Fault Injection." Cryptology ePrint Archive, Report 2020/1193, 2020 (posted 30 Sep. 2020)

SUMMARY OF INVENTION

Technical Problem

An object of the present disclosure is to prevent memory access that is not normally permitted.

Solution to Problem

A program processing device according to the present disclosure comprising:
  a storage unit to store configuration data in which a save value copied from a setting value, a storage storing the setting value, and an entry address are associated with each other;
  an entry address masking unit to execute a mask process in which a fake entry address is generated, the fake entry address being obtained by masking the entry address of the configuration data with a use of the save value, and an entry address used by an application program is replaced with the fake entry address, before execution of the application program;
  a memory monitoring unit to determine whether the fake entry address is loaded during the execution of the application program; and
  an entry address unmasking unit to execute an unmask process in which a new entry address is generated, the new entry address being obtained by loading the setting value from the storage and unmasking the fake entry address with a use of the setting value, and the fake entry address is replaced with the new entry address, when the memory monitoring unit determines that the fake entry address is loaded.

Advantageous Effects of Invention

According to the present disclosure, an entry address used by an application program is masked with the use of a save value, and when the application program uses the entry address, the masked entry address is unmasked with the use of the setting value so as to use the entry address. Thus, an entry address cannot be accessed unless a save value and a setting value match.

DESCRIPTION OF EMBODIMENTS

Figure 1:
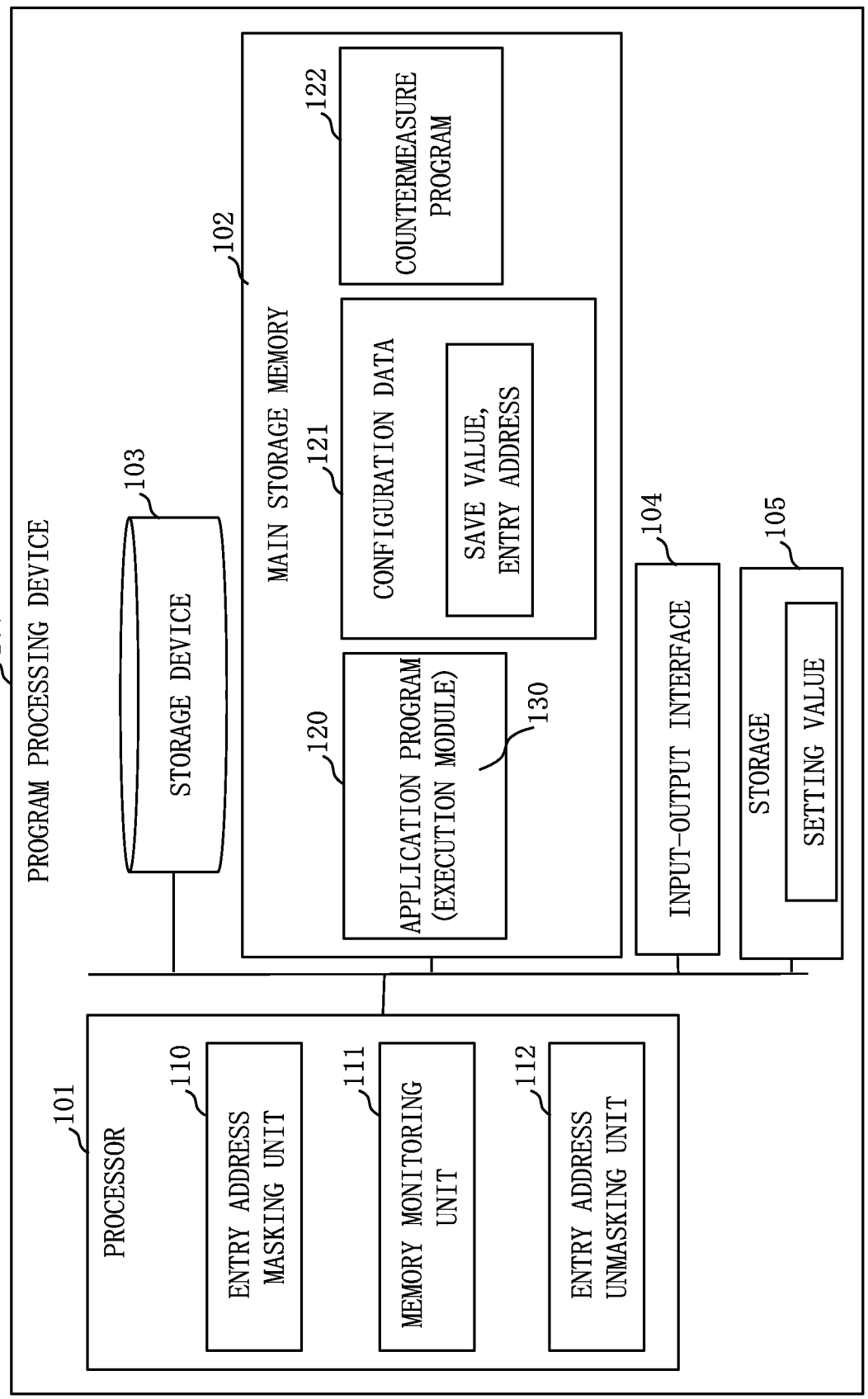
FIG. 1 is a drawing illustrating a configuration example of a program processing device 100 according to Embodiment 1.

In the following description and drawings of embodiments, portions provided with identical reference characters denote identical or equivalent portions.

Embodiment 1

Description on Configuration

A configuration of a program processing device 100 will be described with reference to FIG. 1.

The program processing device 100 is a computer that includes a processor 101, a main storage memory 102, a storage device 103, an input-output interface 104, and a storage 105. These pieces of hardware are mutually connected via a signal line.

The processor 101 is an IC performing arithmetic processing and controls other hardware.

The processor 101 has an arithmetic register and loads commands and data into the arithmetic register to execute data processing in accordance with the commands.

For example, the processor 101 is a CPU or a FPGA.

IC is an abbreviated name of Integrated Circuit.

CPU is an abbreviated name of Central Processing Unit.

FPGA is an abbreviated name of Field Programable Gated Array.

The main storage memory 102 is at least one of a volatile storage device and a non-volatile storage device. A specific example of the volatile storage device is a RAM. A specific example of the non-volatile storage device is a ROM, an HDD, or a flash memory.

RAM is an abbreviated name of Random Access Memory.

ROM is an abbreviated name of Read Only Memory.

HDD is an abbreviated name of Hard Disk Drive.

Hereinafter, an address means a memory address of the main storage memory 102.

The storage device 103 is a non-volatile storage device for storing data. A specific example of the non-volatile storage device is a ROM, an HDD, or a flash memory.

The input-output interface 104 is an interface for input and output. The input-output interface 104 is, for example, a serial communication interface or a debug interface. A specific example of the serial communication interface is an SPI, a UART, or an I2C. A specific example of the debug interface is a JTAG or JWD.

SPI is an abbreviated name of Serial Peripheral Interface.

UART is an abbreviated name of Universal Asynchronous Receiver Transmitter.

I2C is an abbreviated name of Inter-Integrated Circuit.

JTAG is an abbreviated name of Joint Test Action Group.

SWD is an abbreviated name of Serial Wire Debug.

The storage 105 is a storage device.

A specific example of the storage 105 is a memory or a register.

The storage 105 stores data to be accessed by the processor 101.

The storage 105 may be part of the main storage memory 102, part of the storage device 103, a register of the processor 101, or an independent storage device.

The processor 101 includes elements such as an entry address masking unit 110, a memory monitoring unit 111, and an entry address unmasking unit 112.

The entry address masking unit 110 and the entry address unmasking unit 112 are realized by software.

The memory monitoring unit 111 is realized by hardware such as a memory monitoring unit incorporated in a processor. For example, the memory monitoring unit 111 is a memory management unit that translates logical addresses handled by software and physical addresses handled by hardware, or a memory protection unit for preventing unauthorized memory access to a program.

The storage device 103 stores an application program 120 operated by the processor 101, a countermeasure program 122 for executing the entry address masking unit 110 and the entry address unmasking unit 112, and configuration data 121 for operating the countermeasure program 122. The storage device 103 stores an operating system, a network driver, and a storage driver.

As illustrated in FIG. 1, software and data stored in the storage device 103 are read into the main storage memory 102.

The application program 120 is a program whose security is enhanced by the countermeasure program 122.

The application program 120 is a protection target program which is subject to protection.

The application program 120 of Embodiment 1 is an execution module 130 in executable form.

The execution module 130 is written in binary code and written in a machine language that can be interpreted by the processor 101.

FIG. 1 illustrates a state immediately before the processor 101 executes the execution module 130 after reading the execution module 130 into the main storage memory 102.

The countermeasure program 122 is a program that enhances the security of the application program 120.

The countermeasure program 122 is a program that realizes functions of the entry address masking unit 110 and the entry address unmasking unit 112.

The storage 105 stores setting values. A setting value is a value that is associated with an entry address used by the application program 120.

An entry address is an entry point used by an application program.

An entry address is an address for starting execution of a module having a predetermined function. This address is called an entry address because the address is a leading address for starting execution of a module entered in a memory area. Specifically, an entry address is a memory address of a transition destination in a transition command used by the application program 120.

A module may be a subroutine or a function used by the application program 120 in a program or may be another application program.

A setting value is a value corresponding to an entry address.

A setting value may be an attribute value of a module starting at an entry address, a processed value obtained by processing a module starting at an entry address, or a random value unrelated to a module starting at an entry address.

A specific example of the setting value is a value describing privilege to transition to an entry address.

If the application program 120 has transition commands at a plurality of locations but memory addresses of transition destinations are the same as each other, the transition destinations will be a single entry address and the number of setting values will be one corresponding to the single entry address. If the application program 120 has transition commands at a plurality of locations and memory addresses of transition destinations are different from each other, the transition destinations will be a plurality of entry addresses and the number of setting values will be plural corresponding to the plurality of entry addresses.

The program processing device 100 according to Embodiment 1 masks an entry address at the time of start-up of the application program 120 and unmasks the entry address at the time of transition.

The entry address masking unit 110 performs a mask process by using a pair of a save value, which is copied from a setting value, and an entry address. The entry address masking unit 110 masks an entry address used by the application program 120 by using a save value.

The memory monitoring unit 111 monitors access to a masked entry address.

When the memory monitoring unit 111 determines that a masked entry address is accessed, the entry address unmasking unit 112 unmasks the masked entry address, which is loaded, with the use of a setting value so as to extract an original entry address.

Configuration Data 121

Figure 2:
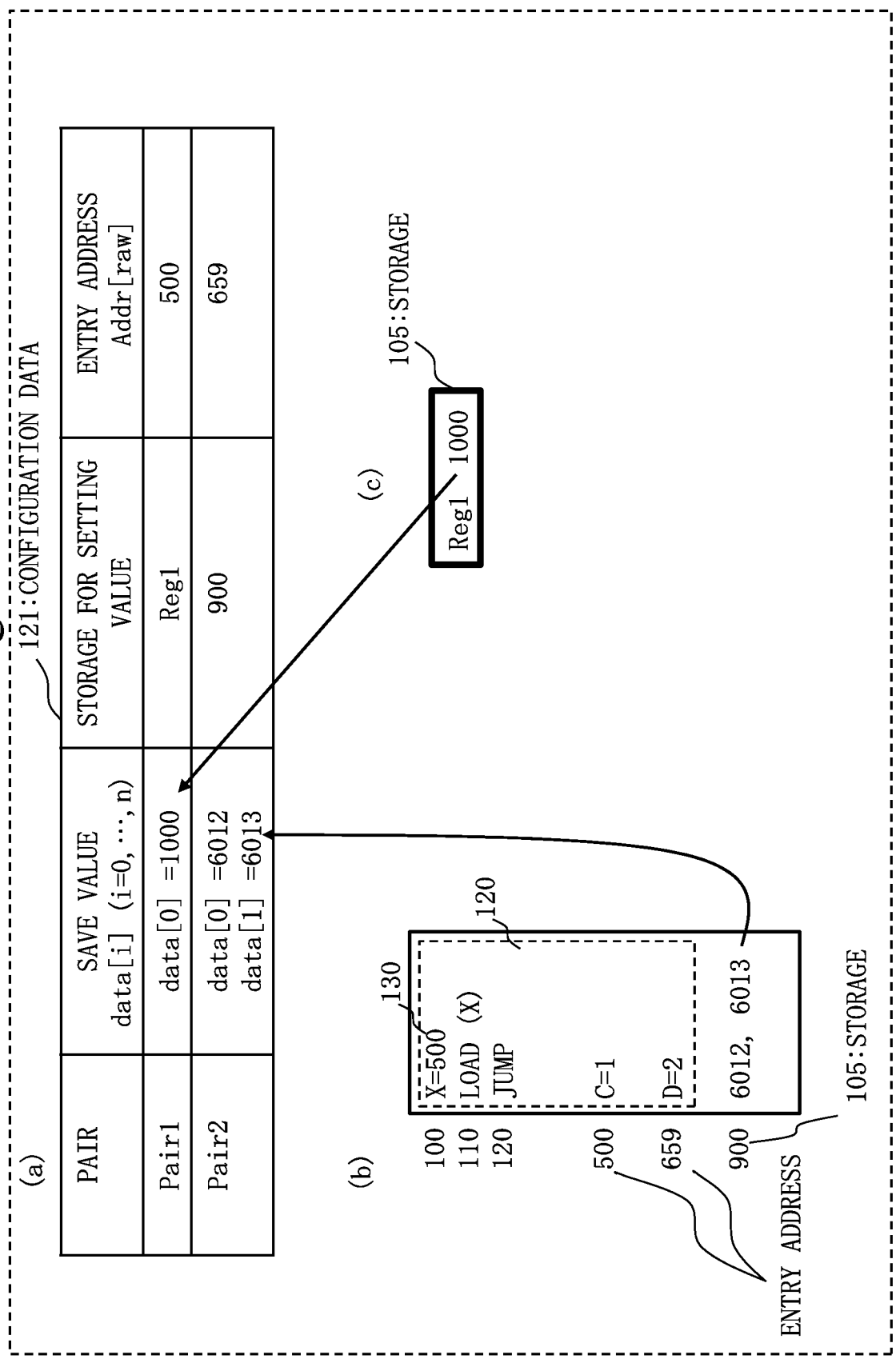
FIG. 2 is a drawing illustrating configuration data 121, an application program 120, and a storage 105 according to Embodiment 1.

The configuration data 121 in FIG. 2 is data that is used by the countermeasure program 122 so as to enhance the security of the application program 120.

The configuration data 121 is a table that associates
1. a save value,
2. a storage for a setting value (an identifier of a storage), and
3. an entry address used by the application program 120 with each other.

A save value is a value that is a copy of a setting value. This value is called a save value because a setting value stored in the storage 105 is saved in the configuration data 121. A setting value and an entry address correspond to each other and therefore, a save value and the entry address also correspond to each other.

A save value and a setting value are values that correspond to an entry address. A save value and a setting value are tamper-proof data and are protection target data which are subject to protection.

The meaning of each item in the configuration data 121 in FIG. 2 is as follows.

"Pair" indicates a pair of a save value and an entry address corresponding to this save value. FIG. 2 illustrates two pairs which are Pair1 and Pair2.

"Save value" is a value that is copied from a setting value stored in the storage 105. A setting value and a save value are identical values immediately after the copying. However, if the setting value is tampered, the setting value and the corresponding save value are mutually-different values. There may be a single save value (setting value) as Pair1 or may be a plurality of save values (setting values) as Pair2 having two save values.

"Storage for setting value" is a memory or a register in which setting values are stored. In FIG. 2, a register name "Reg1" of a register storing the setting value and a memory address "900" of a memory storing the setting values are stored as identifiers for identifying the storages for the setting values.

"Entry address" is an address for starting execution of a module having a predetermined function. In FIG. 2, a memory address "500" and a memory address "659" of transition destinations in transition commands are stored.

Application Program 120

Although the execution module 130 of the application program 120 in FIG. 2 is written in binary code, the execution module 130 is expressed in text form in FIG. 2 to facilitate the explanation.

The execution module 130 in FIG. 2 has a value "500" stored in a variable X at a memory address 100, loads the value "500" of the variable X in accordance with a load command at a memory address 110, and jumps to the memory address 500 in accordance with a jump command at a memory address 120.

The processor 101 executes the application program 120 and the countermeasure program 122 while executing an operating system, a network driver, and a storage driver.

The application program 120, the countermeasure program 122, the operating system, the network driver, and the storage driver that are stored in the storage device 103 are read into the main storage memory 102 and are executed by the processor 101.

The configuration data 121 is read into the main storage memory 102 and accessed by the processor 101.

Here, part or the whole of the application program 120, configuration data 121, and countermeasure program 122 may be incorporated in the operating system.

Data, information, a signal value, and a variable value that are used, processed, or outputted by the application program 120 and the countermeasure program 122 are stored in the main storage memory 102, the storage device 103, or a register or cache memory in the processor 101.

The "unit" of each of the entry address masking unit 110 and the entry address unmasking unit 112 may be read as "process", "procedure", or "step". The "process" of each process by the entry address masking unit 110 and the entry address unmasking unit 112 may be read as "program", "program product", or "computer-readable storage medium on which a program is recorded".

The application program 120 and the countermeasure program 122 make a computer execute each process, each procedure, or each step obtained by reading the "unit" of each of the above-mentioned units as "process", "procedure", or "step".

Further, the program processing method is a method that is performed when the program processing device 100 executes programs.

The application program 120 and the countermeasure program 122 may be provided in a manner to be stored in a computer-readable recording medium. Alternatively, the application program 120 and the countermeasure program 122 may be provided as program products.

Furthermore, the program processing device 100 may be realized by a processing circuit such as a logic IC (Integrated Circuit), a GA (Gate Array), an ASIC (Application Specific Integrated Circuit), and a FPGA (Field-Programmable Gate Array).

A higher concept of a processor, a memory, a combination of processor and memory, and a processing circuit is called a processing circuitry. That is, each of a processor, a memory, a combination of processor and memory, and a processing circuit is a specific example of a processing circuitry.

Outline Description of Program Processing Method

The program processing device 100 generates a fake entry address so as to replace an entry address used by the application program 120 with the fake entry address before execution of the application program 120. The fake entry address is obtained by masking the entry address with the use of a save value.

When a fake entry address is loaded during the execution of the application program 120, the program processing device 100 loads a setting value from the storage 105 and generates a new entry address, which is obtained by unmasking the fake entry address with the use of the setting value, so as to replace the fake entry address with the new entry address.

Detailed Description of Operation

An operation of the program processing device 100 will be described with reference to FIG. 3.

It is assumed that setting values are stored in the storage 105 and values are set in the configuration data 121 before the operation is started. Specifically, it is assumed that a setting value is copied as a save value in the configuration data 121. Further, it is assumed that an identifier of the storage 105 and an entry address associated with a setting value are set in the configuration data 121.

In step S110, the countermeasure program 122 is read from the storage device 103 into the main storage memory 102 and executed.

The countermeasure program 122 reads the application program 120 and the configuration data 121 from the storage device 103 into the main storage memory 102. At this point, the execution module 130 of the application program 120 is read into the main storage memory 102 and the application program 120 becomes to be executable by the processor 101.

In step S120, the entry address masking unit 110 selects one pair from the configuration data 121.

In step S130, the entry address masking unit 110 confirms whether processing of all pairs in the configuration data is finished. When the processing of all pairs in the configuration data 121 is finished, the entry address masking unit 110 informs the processor 101 of the finish of the processing and allows start of step S150. Otherwise, step S140 is executed.

In step S140, the entry address masking unit 110 performs a mask process for an entry address by using a pair.

Mask Process

The mask process for an entry address in step S140 will be described with reference to FIG. 4.

In step S141, the entry address masking unit 110 masks an entry address, which is paired, by using a corresponding save value so as to calculate a masked entry address. Hereinafter, a masked entry address is referred to as a fake entry address.

Specifically, the entry address masking unit 110 applies a hash function to a save value and then applies an XOR operation to the obtained hash value and a corresponding entry address. This process can be expressed by expression (1) below.

$$\text{Addr[mask]}=\text{Addr[raw]}(+)\text{Hash(data[0])}(+) \ldots (+)\text{Hash(data}[n]) \quad \text{expression (1)}$$

Here,

Addr[mask] indicates a fake entry address (masked entry address),

Addr[raw] indicates an original entry address provided as a pair,

Hash( ) indicates the hash function, (+) indicates the XOR (eXclusive OR) operation, data indicates a save value provided as the pair, data[i] (i=0 . . . n) indicates the i-th save value, and Hash(data[i]) indicates a hash value of the i-th save value.

Figure 5:
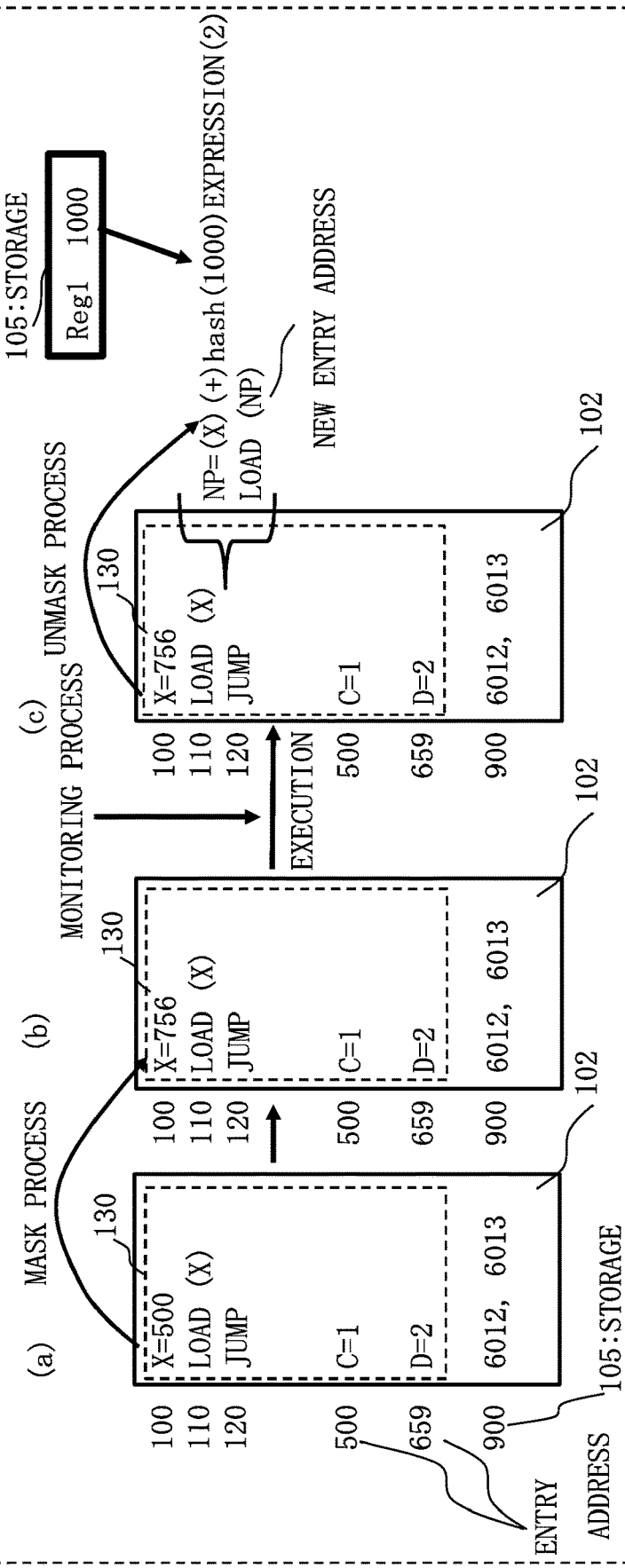
FIG. 5 is a drawing illustrating the configuration data 121 and a processing example according to Embodiment 1.

FIG. 5 illustrates the configuration data 121 revised by the entry address masking unit 110.

The configuration data 121 in FIG. 5 is obtained by adding a fake entry address to the configuration data 121 in FIG. 2.

Since the number of save values of Pair1 is one, expression (1) is established as follows:

$$\text{Addr[mask]}=\text{Addr[raw]}(+)\text{Hash(data[0])}$$

The fake entry address is assumed to be 756 in FIG. 5.

$$756=500(+)\text{Hash}(1000)$$

Since the number of save values of Pair2 is two, expression (1) is established as follows:

$$\text{Addr[mask]}=\text{Addr[raw]}(+)\text{Hash(data[0])}(+)\text{Hash(data[1])}$$

The fake entry address is assumed to be 560 in FIG. 5.

$$560=659(+)\text{Hash}(6012)(+)\text{Hash}(6013)$$

The hash function may be a cryptographic hash function such as md5 and SHA256. The hash function may be a non-cryptographic hash function such as CRC32 and xxHash. The hash function may be a universal hash function such as Toeplitz hash.

md5 is an abbreviated name of Message Digest algorithm 5.

SHA 256 is an abbreviated name of Secure Hash Algorithm.

CRC is an abbreviated name of Cyclic Redundancy Checksum.

The entry address masking unit 110 stores the configuration data 121 of FIG. 5 in the main storage memory 102. The configuration data 121 is referred to by the memory monitoring unit 111 and the entry address unmasking unit 112.

In step S142, the entry address masking unit 110 searches for a jump command to an entry address, which is paired, from the application program 120. Specifically, the processor 101 searches for a process for loading a value of an entry address into a register and a jump command appearing after the process, from the execution module 130 of the application program 120. The entry address masking unit 110 ignores jump commands other than a jump command to an entry address.

As for the execution module 130 in (a) of FIG. 5, the entry address masking unit 110 detects a load command at the memory address 110 and a jump command at the memory address 120.

In step S143, the entry address masking unit 110 determines whether the detection of all jump commands to entry addresses is finished. When the detection of all jump commands to entry addresses is finished, the processing is ended. Otherwise, step S144 is executed.

In step S144, the entry address masking unit 110 replaces, with the fake entry address that is calculated in step S141, data (entry address) that is loaded in accordance with a load command of entry address. Specifically, data stored at a memory address of a load source is replaced with the fake entry address.

As for the execution module 130 in (a) of FIG. 5, the entry address masking unit 110 replaces the value "500" that is stored in the variable X at the memory address 100 with the value "756" of the fake entry address ((b) of FIG. 5).

Monitoring Process

In step S150, the processor 101 starts execution of the application program 120 whose entry address is subject to the mask process. At the same time, the memory monitoring unit 11 starts monitoring of the application program 120.

In FIG. 5, the processor 101 executes the application program 120 in (b) of FIG. 5. The memory monitoring unit 111 starts monitoring of the application program 120 in (b) of FIG. 5.

In step S160, the memory monitoring unit 111 refers to the fake entry address of the configuration data 121 during the execution of the application program 120 so as to check whether the fake entry address is loaded on the arithmetic register of the processor 101. When the fake entry address is loaded on the arithmetic register, step S170 is executed. Otherwise, the processing returns to step S150 and the processor 101 continues the execution of the application program 120.

As for the application program 120 in (b) of FIG. 5, the memory monitoring unit 111 detects the loading of the value "756" of the fake entry address in the execution of the memory address 110 and detects the jump command of the memory address 120. The memory monitoring unit 111 interrupts the execution of the application program 120 without executing the jump command.

Here, such execution of special process in accordance with a certain condition can be realized when the memory monitoring unit 111 generates an exception or an interrupt. The exception or the interrupt can cause the processor 101 to interrupt the processing of the program being executed and execute the process of step S170.

Unmask Process

In step S170, the processor 101 starts up the entry address unmasking unit 112. The entry address unmasking unit 112 refers to "storage for setting value" stored in the configuration data 121 and loads a setting value from the storage 105.

As for the application program 120 in (b) of FIG. 5, when the loading of the value "756" of the fake entry address is detected, the entry address unmasking unit 112 accesses the storage "Reg1" corresponding to the value "756" of the fake entry address and loads a setting value "1000".

In step S180, the entry address unmasking unit 112 unmasks the fake entry address, loaded in step S160, by using the setting value loaded in step S170. Hereinafter, an unmasked entry address is referred to as a new entry address.

Specifically, an original entry address can be restored by applying the XOR operation in an opposite way to expression (1), as expressed in expression (2) below.

$$\text{Addr[raw]=Addr[mask](+)Hash(data[0])(+)}\ldots\\(+)\text{Hash(data}[n]) \quad \text{expression (2)}$$

The entry address unmasking unit 112 replaces the fake entry address, loaded in step S160, with the new entry address ((c) of FIG. 5).

The entry address unmasking unit 112 informs the processor 101 of the finish of the processing and the processing is finished.

When the entry address unmasking unit 112 achieves restoration of an original entry address, the application program 120 jumps to the original entry address.

In (c) of FIG. 5, the entry address unmasking unit 112 calculates the new entry address NP=(X)(+)hash(1000) based on expression (2). Here, (X) is assumed to indicate a value of the variable X. The entry address unmasking unit 112 executes a command "LOAD (NP)" for loading a new entry address NP. Here, (NP) is assumed to indicate a value of the variable NP.

In (c) of FIG. 5, the original entry address 500=the new entry address 500 is established. The application program 120 jumps to the entry address "500".

After the unmask process in step S180, the processing returns to step S150 and the processor 101 continues to execute the program.

If the fake entry address is correctly unmasked through the process of step S170 and step S180, transition to a correct entry address can be realized in accordance with the following jump command. Success of transition to an entry address can guarantee that a correct setting value is stored in the storage 105.

On the other hand, in the case where a setting value of the storage 105 is tampered by a fraudulent attack, a fake entry address cannot be correctly unmasked and a corresponding entry address cannot be correctly restored. Therefore, the subsequent jump command results in abnormal transition, and the fraudulent attack does not succeed.

The process of the entry address masking unit 110 is the process of step S140.

The process of the memory monitoring unit 111 is the process of step S160.

The process of the entry address unmasking unit is the process of step S170 and step S180.

The process of the application program 120 is the process of step S150.

Figure 3:
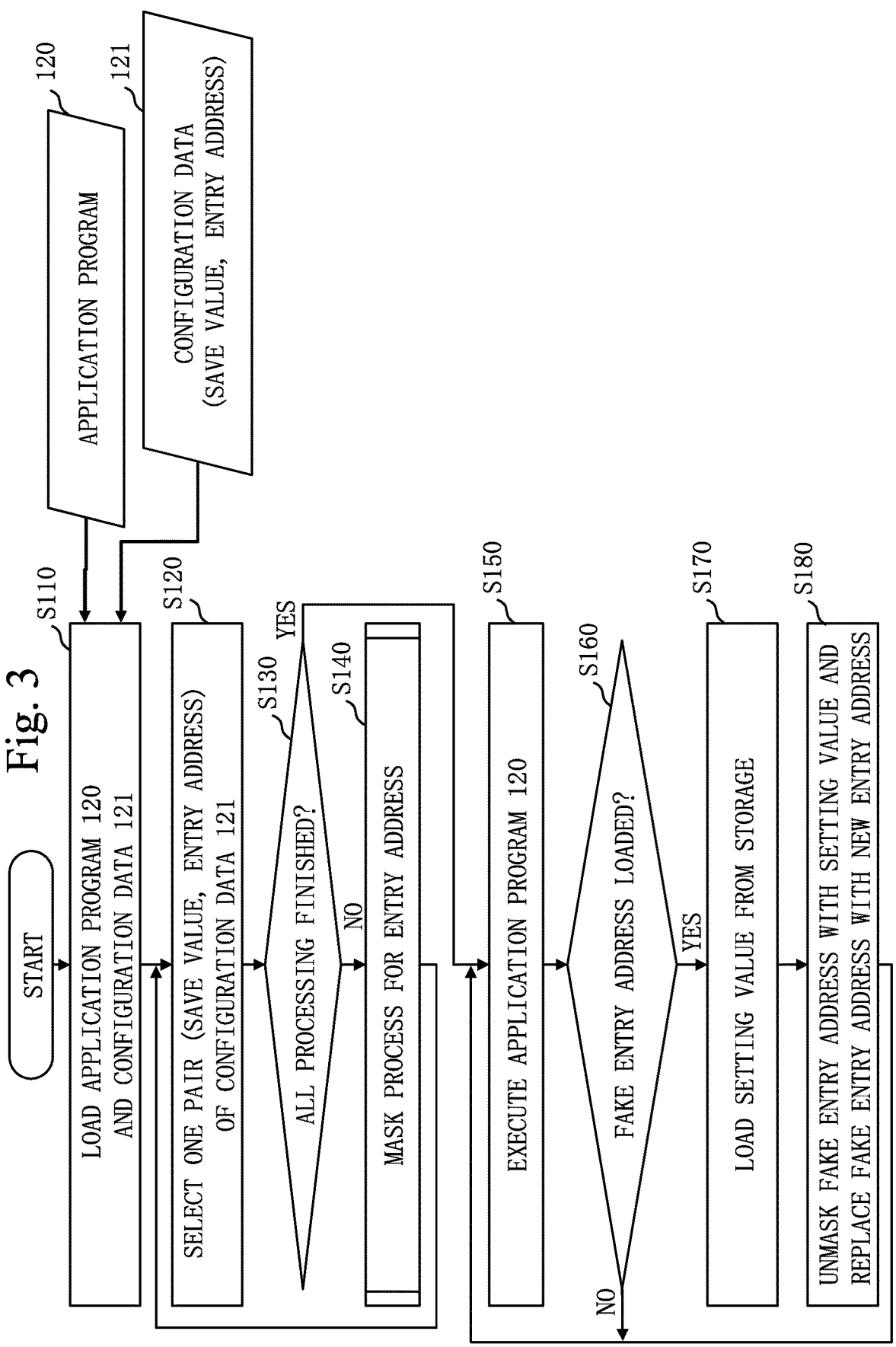
FIG. 3 is a flowchart showing an operation example of the program processing device 100 according to Embodiment 1.

The process of the countermeasure program 122 is all processes in FIG. 3 other than the process of step S150 and step S160.

In Embodiment 1, an entry address used by the application program 120 is masked by using a save value. Then, when the application program 120 uses the entry address, the entry address is unmasked based on a setting value so as to use the entry address. Therefore, an entry address cannot be correctly accessed unless a save value and a setting value match.

The program processing device 100 according to Embodiment 1 masks entry addresses. Accordingly, there is no problem even if setting values set in the storage 105 are read by attackers.

Further, fake entry addresses are values masked by hash values and therefore, there is no problem even if the fake entry addresses are read by attackers.

Application to TEE

Application of Embodiment 1 to Trusted Execution Environment (TEE) will be described.

TEE realizes a safe execution environment for applications through support by hardware as well as software.

TEE is provided by a processor having a resource separation mechanism based on memory access monitoring.

In a system providing a TEE, access control between applications is performed by using a memory protection mechanism (a mechanism called Physical Memory Protection, for example) included in a processor. The memory protection mechanism checks an access privilege on every memory access. The memory protection mechanism sets an access privilege of another application at the time of execution of transition to the other application program. The memory protection mechanism checks an access privilege on every execution start of an application program. The memory protection mechanism performs memory access control based on an access privilege.

The following is the case in which Embodiment 1 is applied to a memory protection mechanism.

The program processing device 100 executes the application program 120 stored in the storage device 103 after applying countermeasures against fault injection attacks.

The fault injection attack is an attack that causes an error in processing of a processor and skips access privilege settings of the memory protection mechanism in transition of processing of the processor to a transition destination.

An entry address is an entry address of an application program running in the TEE. An entry address is an execution starting address of a plurality of application programs running in a processor.

A setting value is a value that indicates an access privilege of a memory protection mechanism set for every application program. A setting value is a value that indicates an access privilege set with respect to a memory area by a memory protection mechanism.

An access privilege is defined by a memory area and an attribute with respect to this memory area.

A memory area is a range of a memory indicated by a memory address.

An attribute is a value indicating whether any act of execution, reading, or writing is possible with respect to data in a memory area.

A storage is a register or a memory to which a memory protection mechanism refers or a register or a memory that the memory protection mechanism uses. Specifically, a storage is a special register or a special memory included in a memory protection mechanism.

The following is the case in which Embodiment 1 is applied to a memory protection mechanism.

Mask Process

The entry address masking unit 110 masks an execution starting address of an application program based on a value (save value), which indicates an access privilege used for monitoring memory access to the application program, so as to generate a fake entry address. Then, the execution starting address of the application program is replaced with the fake entry address.

Monitoring Process

The memory monitoring unit 111 refers to the fake entry address of the configuration data 121 during the execution of the application program 120 so as to check whether the fake entry address is loaded. Then, the memory monitoring unit 111 checks whether there is transition to another application program.

Unmask Process

The entry address unmasking unit 112 unmasks the fake entry address based on a value (setting value), which is stored in a storage and indicates an access privilege, at the start of execution of transition to another application program so as to generate a new entry address. The entry address unmasking unit 112 sets the new entry address to an execution starting address of the other application program.

As described above, an entry address is an execution starting address of an application program and a setting value is a value that indicates an access privilege of a memory protection mechanism set for every application program. The memory protection mechanism checks an access privilege with respect to an application program on every execution start of the application program.

The program processing device 100 according to Embodiment 1 provides a system that disables execution start from a correct entry address in the case where an access privilege is tampered. Accordingly, in the case where an access privilege of a memory protection mechanism is tampered, it is impossible to start execution from an execution starting address of a corresponding application program.

The program processing device 100 according to Embodiment 1 guarantees that an access privilege of the memory protection mechanism is correctly set even in an attack environment where arbitrary processing can be skipped by a fault injection attack. The program processing device 100 according to Embodiment 1 is capable of guaranteeing checking of an access privilege of a memory protection mechanism and prohibiting unauthorized execution of an application program.

According to Embodiment 1, it can be ensured that an access privilege value of a memory protection mechanism is not tampered when an application program is executed under the TEE. This disables an attack for referring to an execution starting address of another application program (memory address at which another application program is placed) from an application program.

In addition, according to Embodiment 1, a fault injection attack to a memory protection mechanism can be prevented.

Feature of Embodiment 1

The program processing device 100 is a signal processing device that processes an application program which uses an entry address and a setting value corresponding to the entry address.

The program processing device includes a storage unit that stores configuration data in which a save value copied from a setting value, an identifier of a storage storing the setting value, and an entry address are associated with each other.

Before execution of the application program 120, the entry address masking unit 110 executes the following mask process:

1. generating a fake entry address which is obtained by masking an entry address of the configuration data 121 with the use of a save value of the configuration data 121, and
2. replacing an entry address used by the application program 120 with the fake entry address.

The memory monitoring unit 111 determines whether the fake entry address is loaded during the execution of the application program 120.

When the memory monitoring unit 111 determines that the fake entry address is loaded, the entry address unmasking unit 112 executes the following unmask process:

1. generating a new entry address which is obtained by loading a setting value from the storage 105 and unmasking the fake entry address with the use of the setting value, and
2. replacing the fake entry address with the new entry address.

Advantageous Effect of Embodiment 1

According to the program processing device 100 of Embodiment 1, the application program 120 is executed by applying countermeasures composed of the mask process and the unmask process to the application program 120 based on the configuration data 121. As a result, correct transition to an entry address is impossible unless a save value and a setting value match. Thus, success of transition to an entry address can guarantee that a correct setting value is stored in a storage.

Description of Another Example

The mask process may employ an encryption process using a private key, and the unmask process may employ a decryption process using a private key.

For example, in the mask process for entry address, the calculation expression of a fake entry address shown in step S141 may be expression (3) below.

$$\text{Addr[mask]}=\text{Addr[raw]}(+)Enc(\text{data}[0],\text{key})(+)\ldots(+)Enc(\text{data}[n],\text{key}) \quad \text{expression (3)}$$

Here, Enc( ) and key indicate an encryption process and a private key respectively. Enc(data[0],key) is obtained by encrypting data[0] with key which indicates a private key. The encryption process may employ ciphers such as AES and RSA (registered trademark).

When expression (1) is replaced with expression (3) in the mask process for entry address, the unmask process shown in step S180 needs to be replaced as follows:

$$\text{Addr[raw]}=\text{Addr[mask]}(+)Enc(\text{data}[0],\text{key})(+)\ldots(+)Enc(\text{data}[n],\text{key}) \quad \text{expression (4).}$$

AES is an abbreviated name of Advanced Encryption Standard.

RSA (registered trademark) is an abbreviated name of Rivest-Shamir-Adleman cryptosystem.

Description of Still Another Example

In the mask process, an entry address may be encrypted by using an entry address as data and using a save value as a private key so as to generate a fake entry address. In the unmask process, a new entry address may be decrypted by using the fake entry address as data and using a setting value as a private key.

For example, in the mask process for entry address, the calculation expression of a masked entry address shown in step S141 may be expression (5) below.

$$\text{Addr[mask]}=Enc(\ldots Enc(Enc(\text{Addr[raw]},\text{data}[0]), \text{data}[1])\ldots,\text{data}[n]) \quad \text{expression (5)}$$

Enc(Addr[raw],data[0]) is obtained by encrypting Addr [raw] with data[0] which indicates a key.

Enc(Enc(Addr[raw],data[0]),data[1]) is obtained by further encrypting, with data[1] which indicates a key, the encrypted result, which is obtained by encrypting Addr[raw] with data[0] indicating a key.

Expression (5) is a process for providing an original entry address as data for the encryption process and providing a save value as a key. Encryption is further repeated by using the encrypted result thus obtained as data and using the save value as a key.

When expression (1) is replaced with expression (5) in the mask process for entry address, the unmask process shown in step S180 needs to be replaced as follows:

$$\text{Addr[raw]}=Dec(\ldots Dec(Dec(\text{Addr[mask]},\text{data}[n]), \text{data}[n-1])\ldots,\text{data}[0]) \quad \text{expression (6)}.$$

Dec(Addr[mask],data[n]) is obtained by decrypting Addr [mask] with data[n] which indicates a key.

Dec(Dec(Addr[mask],data[n]),data[n-1]) is obtained by further decrypting, with data[n-1] which indicates a key, the decrypted result, which is obtained by decrypting Addr [mask] with data[n] indicating a key.

Here, Dec indicates a decryption process paired with Enc shown in expression (5). Note that data[i] is given in the reverse order of that of the encryption process. Because of the feature mentioned above, ciphers used in the mask process for entry address and the unmask process realized by expression (5) and expression (6) have to be common key ciphers. For example, a block cipher or a stream cipher such as AES and KCipher-2 may be employed.

Description of Yet Another Example

A transition command does not have to be a jump command but may be a GOTO command, a CALL command, a RETURN command, a function execution command, or a subroutine execution command.

Description of Yet Another Example

The application program 120 and the configuration data 121 may be supplied not from the storage device 103 but from an outside via the input-output interface 104.

Description of Yet Another Example

The entry address masking unit 110 may set a memory address of a transition destination, which is found based on search results according to a load command and a jump command, as an entry address of the configuration data 121.

Description of Yet Another Example

The program processing device 100 according to Embodiment 1 may be used for secure boot protection.

Secure boot transitions to a start-up process for a boot code after a process for checking a hash value of the boot code. The fault injection attack skips this process for checking a hash value and allows start-up with an unauthorized boot code.

When the program processing device 100 according to Embodiment 1 is applied to secure boot protection, a setting value and a save value may be set as a hash value of a boot code and an entry address may be set as an execution starting address of the boot code.

Setting value=save value=boot code hash value

Entry address=boot code execution starting address

According to the program processing device 100 of Embodiment 1, transition to a correct execution starting address of a boot code is disabled unless a hash value of the boot code as a save value and a hash value of the boot code as a setting value match.

Description of Yet Another Example

The program processing device 100 according to Embodiment 1 may be used for protection of an authentication check process.

In the authentication check process, a password is received from a user and the password is authenticated, and when the password is correct, the process transitions to a post-authentication process. The fault injection attack skips password authentication and allows unauthorized execution of post-authentication process.

When the program processing device 100 according to Embodiment 1 is applied to protection of an authentication check process, a setting value and a save value may be set as a value of a password authentication result and an entry address may be set as an execution starting address of post-authentication process.

Setting value=save value=value of password authentication result

Entry address=execution starting address of post-authentication process

According to the program processing device 100 of Embodiment 1, transition to a correct execution starting address after password authentication is disabled unless a value of a password authentication result as a save value and a value of the password authentication result as a setting value match.

Embodiment 2

In Embodiment 2, the points different from Embodiment 1 will be described.

A program processing device 200 according to Embodiment 2 acquires a program code 140 of the application program 120 from the input-output interface 104. The program processing device 200 generates the application program 120 realizing the entire operation of the program processing device 100 only by software. Specifically, the program processing device 200 generates an execution module with countermeasures by applying countermeasures against fault injection attacks to the program code 140.

Description on Configuration

A configuration of the program processing device 200 will be described with reference to FIG. 6.

The program processing device 200 is a computer that includes the processor 101, the main storage memory 102, and the input-output interface 104. These pieces of hardware are mutually connected via a signal line.

The input-output interface 104 is an interface for input and output. The input-output interface 104 is, for example, a serial communication interface or a network interface. A specific example of the serial communication interface is an SPI, a UART, or an I2C. A specific example of the network interface is Ethernet (registered trademark).

The processor 101 includes elements such as a transition specification unit 210, an entry address masking unit 211, an unmask process addition unit 212, and a code generation unit 213. The transition specification unit 210, the entry address masking unit 211, the unmask process addition unit 212, and the code generation unit 213 are realized as software stored in the main storage memory 102.

The input-output interface 104 receives the program code 140 of the application program 120 and the configuration data 121 which is described in Embodiment 1 from an outside. Further, the input-output interface 104 transmits the execution module with countermeasures generated by the program processing device 200 to the outside.

The countermeasure program 122 is a program that enhances the security of the application program 120.

The countermeasure program 122 is a program that realizes functions of the transition specification unit 210, the entry address masking unit 211, the unmask process addition unit 212, and the code generation unit 213.

The countermeasure program 122 is an editor editing the program code 140 and the program code 140 is data edited by the countermeasure program 122.

Figure 6:
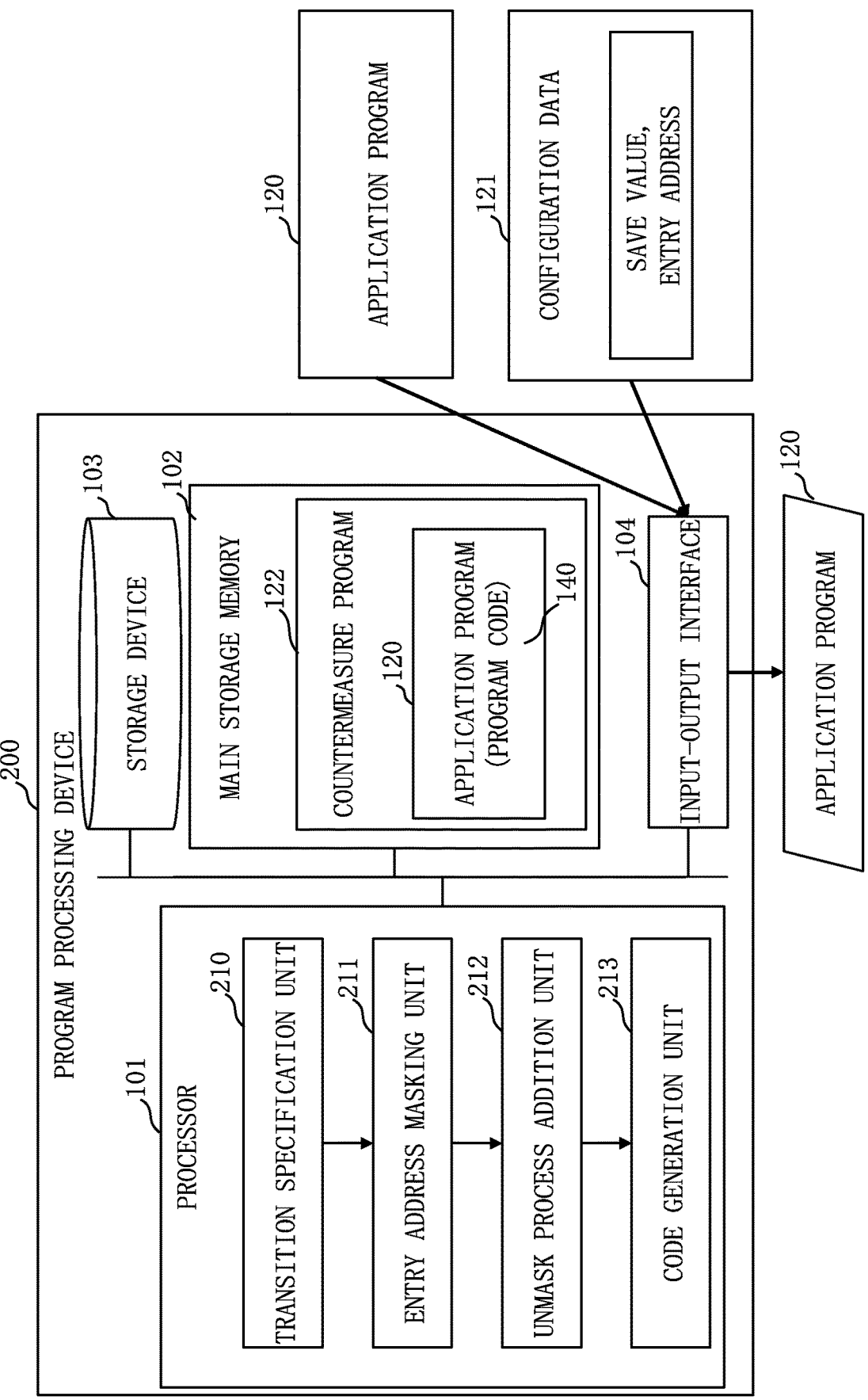
FIG. 6 is a drawing illustrating a configuration example of a program processing device 200 according to Embodiment 2.

FIG. 6 illustrates a state in which the countermeasure program 122 reads the program code 140 as data to be edited into the main storage memory 102.

Description of Operation

Figure 7:
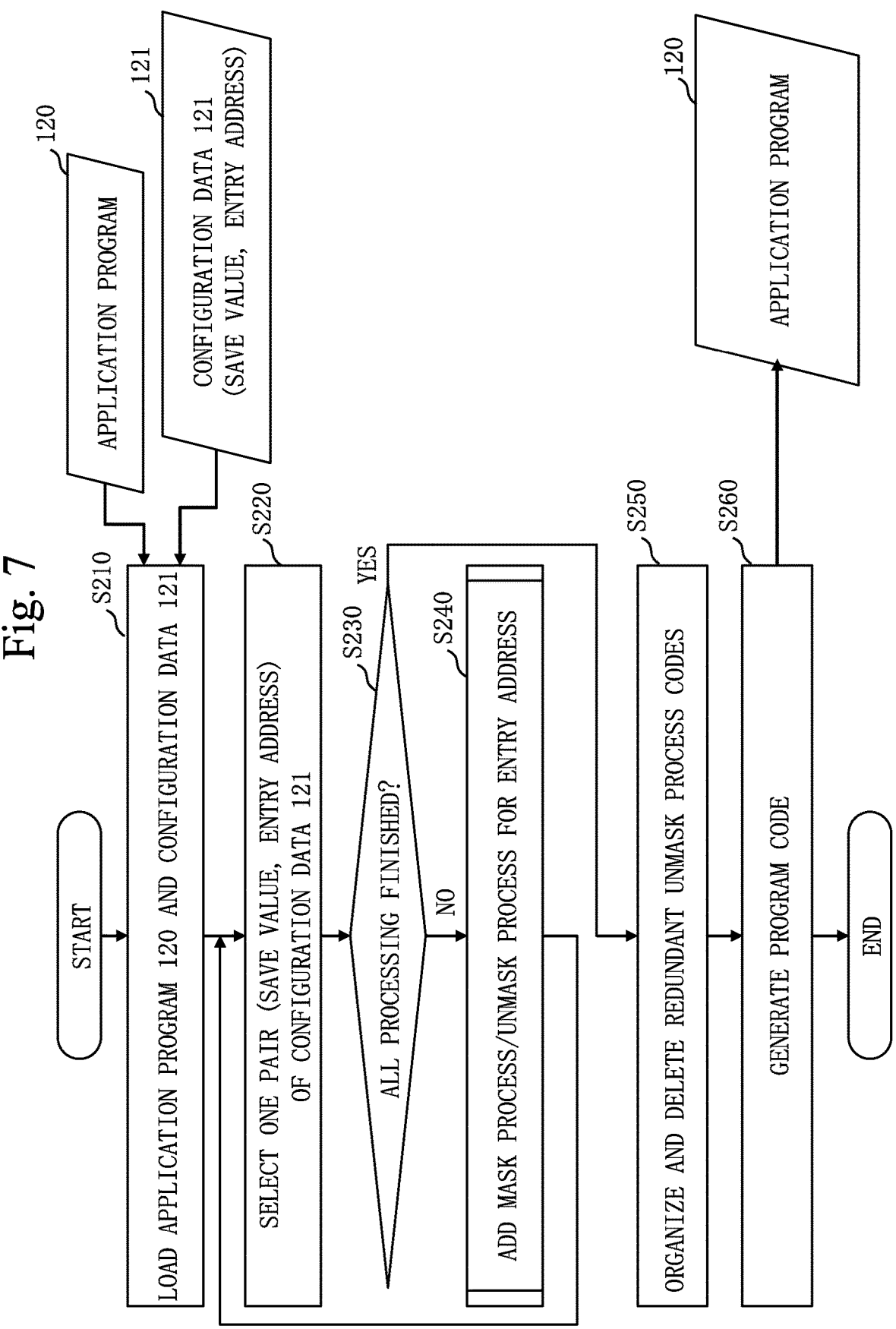
FIG. 7 is a flowchart showing an operation example of the program processing device 200 according to Embodiment 2.

An operation of the program processing device 200 will be described with reference to FIG. 7.

In step S210, the processor 101 receives the program code 140 of the application program 120 and the configuration data 121 via the input-output interface 104 and reads the program code 140 and the configuration data 121 into the main storage memory 102.

The configuration data 121 is assumed to be the same as that illustrated in FIG. 2.

In step S220, the entry address masking unit 211 selects one pair of the configuration data 121.

In step S230, the entry address masking unit 211 confirms whether processing of all pairs is finished. When the processing of all pairs is finished, step S250 is executed. Otherwise, step S240 is executed.

In step S240, the entry address masking unit 211 performs a mask process for an entry address with respect to the program code 140 and the entry address masking unit 211 adds an unmask process for the entry address.

Figure 8:
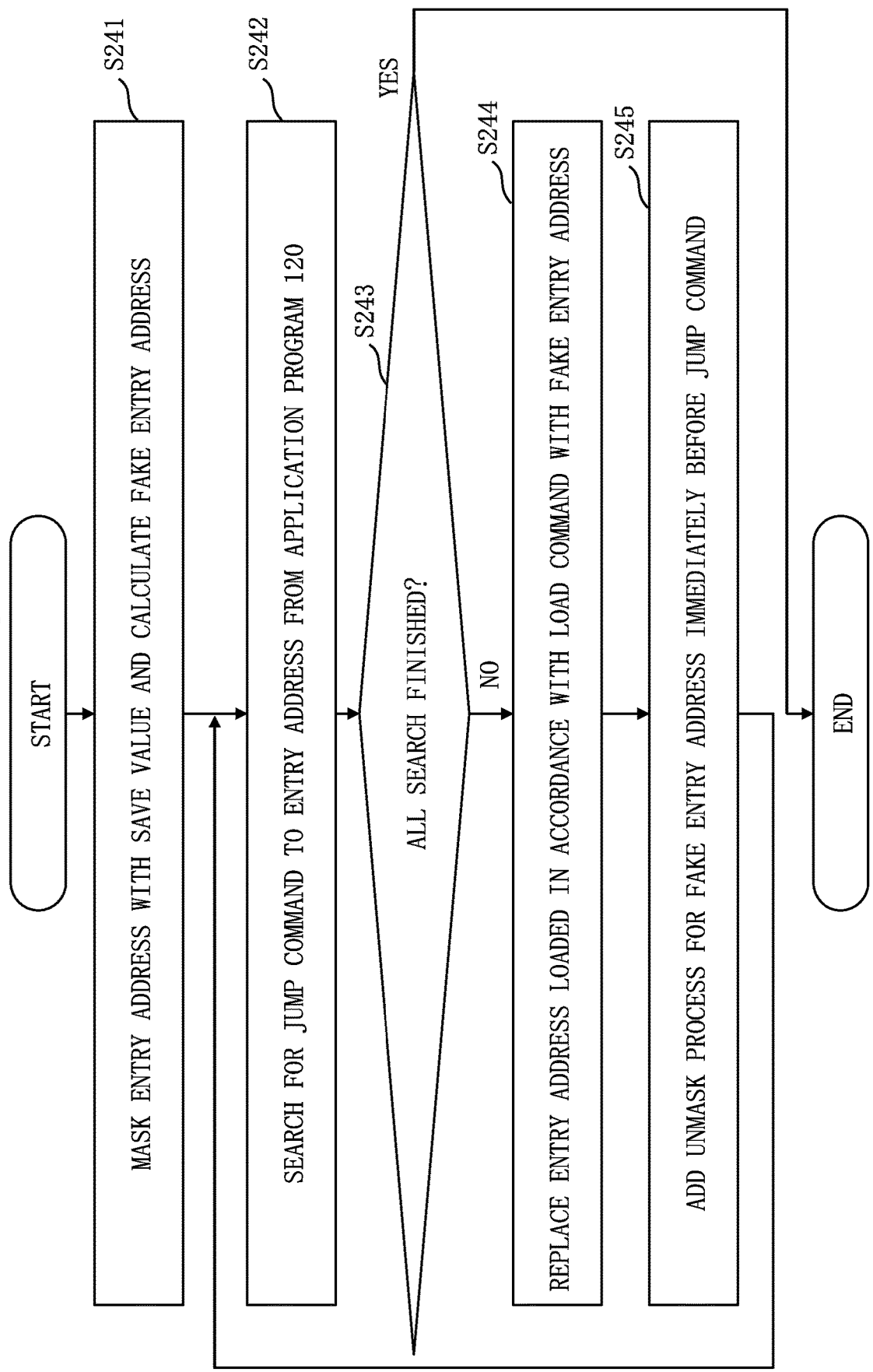
FIG. 8 is a flowchart showing an operation example of step S240 according to Embodiment 2.

The process of step S240 will be described with reference to FIG. 8.

Figure 4:
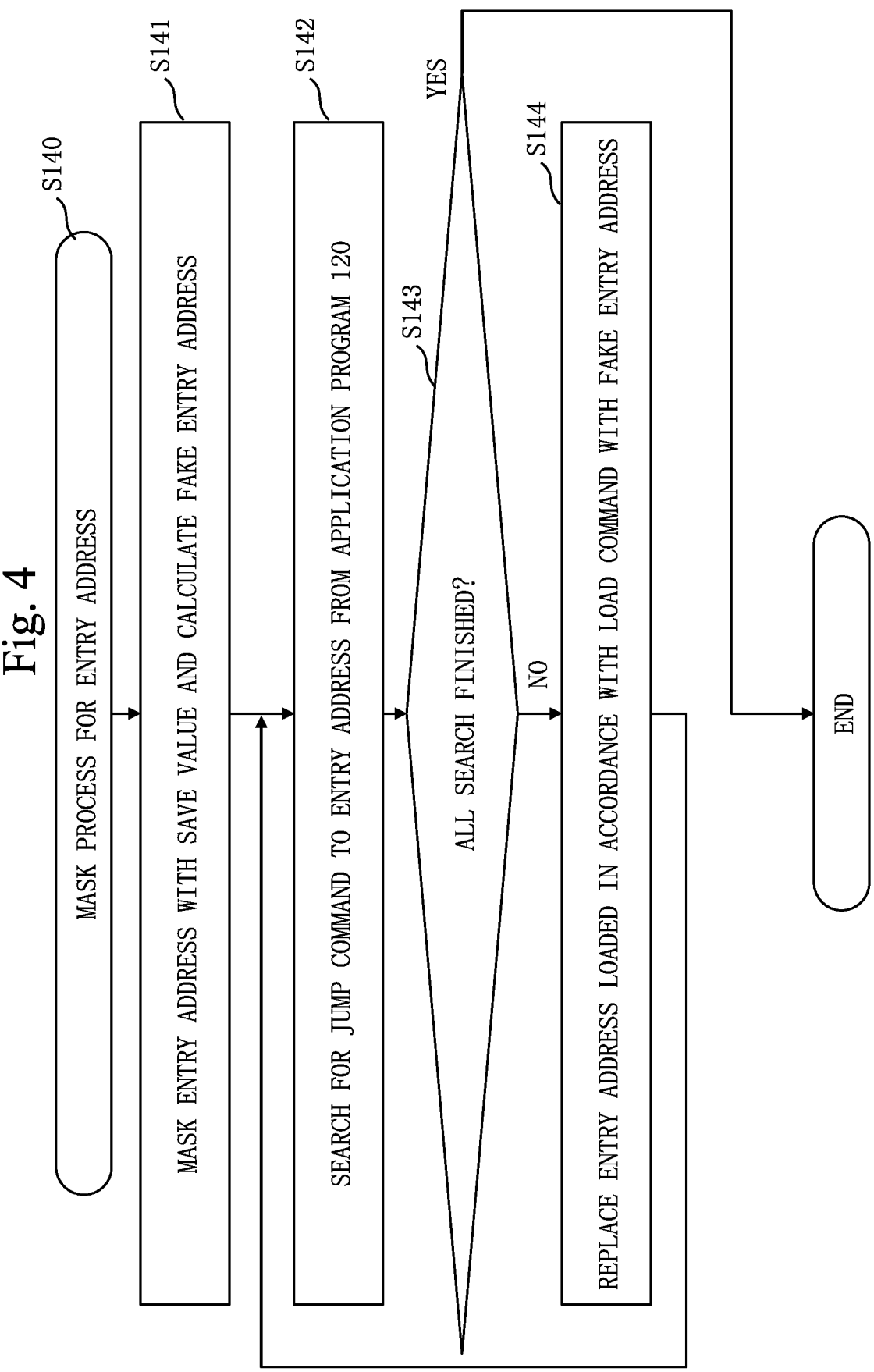
FIG. 4 is a flowchart showing an operation example of step S140 according to Embodiment 1.

Many of the processes in step S240 is the same as the mask process of Embodiment 1 (FIG. 4). Specifically, step S241, step S242, step S243, and step S244 correspond to step S141, step S142, step S143, and step S144 respectively. However, there is a difference that an object to which countermeasures are applied is the execution module 130 immediately before the start of execution in Embodiment 1, while the object is the program code 140 in Embodiment 2.

Mask Process

In step S241, the entry address masking unit 211 calculates a masked entry address based on expression (1) with the use of a save value. Hereinafter, a masked entry address is referred to as a fake entry address.

Figure 9:
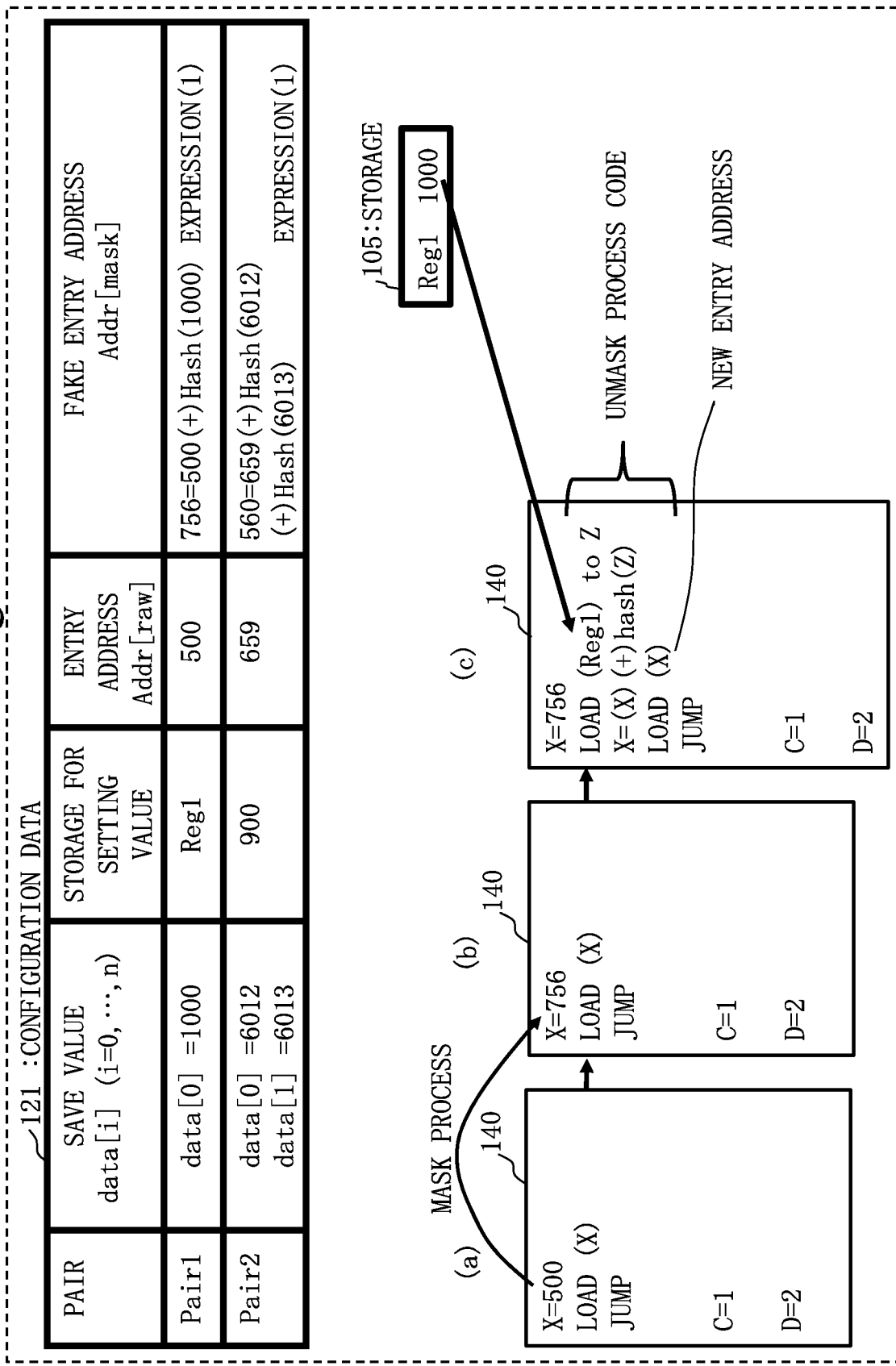
FIG. 9 is a drawing illustrating the configuration data 121 and a processing example according to Embodiment 2.

FIG. 9 illustrates the configuration data 121 revised by the entry address masking unit 211. The configuration data 121 in FIG. 9 is the same as that illustrated in FIG. 5.

In step S242, the transition specification unit 210 searches for a jump command to entry address from the program code 140. Specifically, the transition specification unit 210 searches for a process for loading a value of an entry address onto a register and a jump command existing after the load process, from the program code 140.

As for the program code 140 in (a) of FIG. 9, it is assumed that a value "500" is stored in variable X on the first line and the value "500" of the variable X is loaded on the second line and jumps to the memory address 200 in accordance with a jump command of the third line. The entry address masking unit 211 detects the jump command of the third line.

In step S243, the entry address masking unit 211 determines whether the detection of all jump commands to entry addresses is finished. When the detection of all jump commands to entry addresses is finished, the processing is ended. Otherwise, step S244 is executed.

In step S244, the entry address masking unit 211 replaces the entry address that is loaded in accordance with the load command searched for by the transition specification unit 210 with the fake entry address that is calculated in step S241. Specifically, data that is set in the variable of the program code 140 is replaced with the fake entry address.

As for the program code 140 in (a) of FIG. 9, the entry address masking unit 211 replaces the value "500" set in the variable X with a value "756" of the fake entry address ((b) of FIG. 9).

Step S245 which is the difference from Embodiment 1 will be described.

In step S245, the unmask process addition unit 212 adds an unmask process to the program code 140 immediately before the jump command to entry address specified in step S242. In the unmask process, the fake entry address is unmasked with the use of a setting value. Specifically, an unmask process code based on expression (2) is written in the same language as that of the program code 140 and added to the program code 140.

In (c) of FIG. 9, the unmask process addition unit 212 adds a load command "LOAD Reg1 to Z" for loading a setting value "1000" from the storage "Reg1" onto a variable Z and a calculation expression "X=(X)(+)hash(Z)" for calculating a new entry address based on expression (2). Thus, when an unmask process code is executed, original entry address=new entry address is established.

The mask process for entry address may be a process based on expression (1) and may be either process based on expression (3) or expression (5).

When the entry address masking unit 211 performs the mask process shown in expression (3) or expression (5), the unmask process addition unit 212 adds an unmask process code shown in expression (4) or expression (6). The unmask process based on an unmask process code has to be the process corresponding to the mask process.

In step S250, the code generation unit 213 organizes a plurality of unmask process codes, which are added in step S245, and deletes unnecessary unmask process codes.

For example, when the application program 120 transitions to the same application program at a plurality of locations, corresponding unmask process codes are identical codes and the identical unmask process codes are redundant, resulting in an unnecessary process. Accordingly, the unmask process is deleted for the duplication in which the application program 120 transitions to the same application program.

Figure 10:
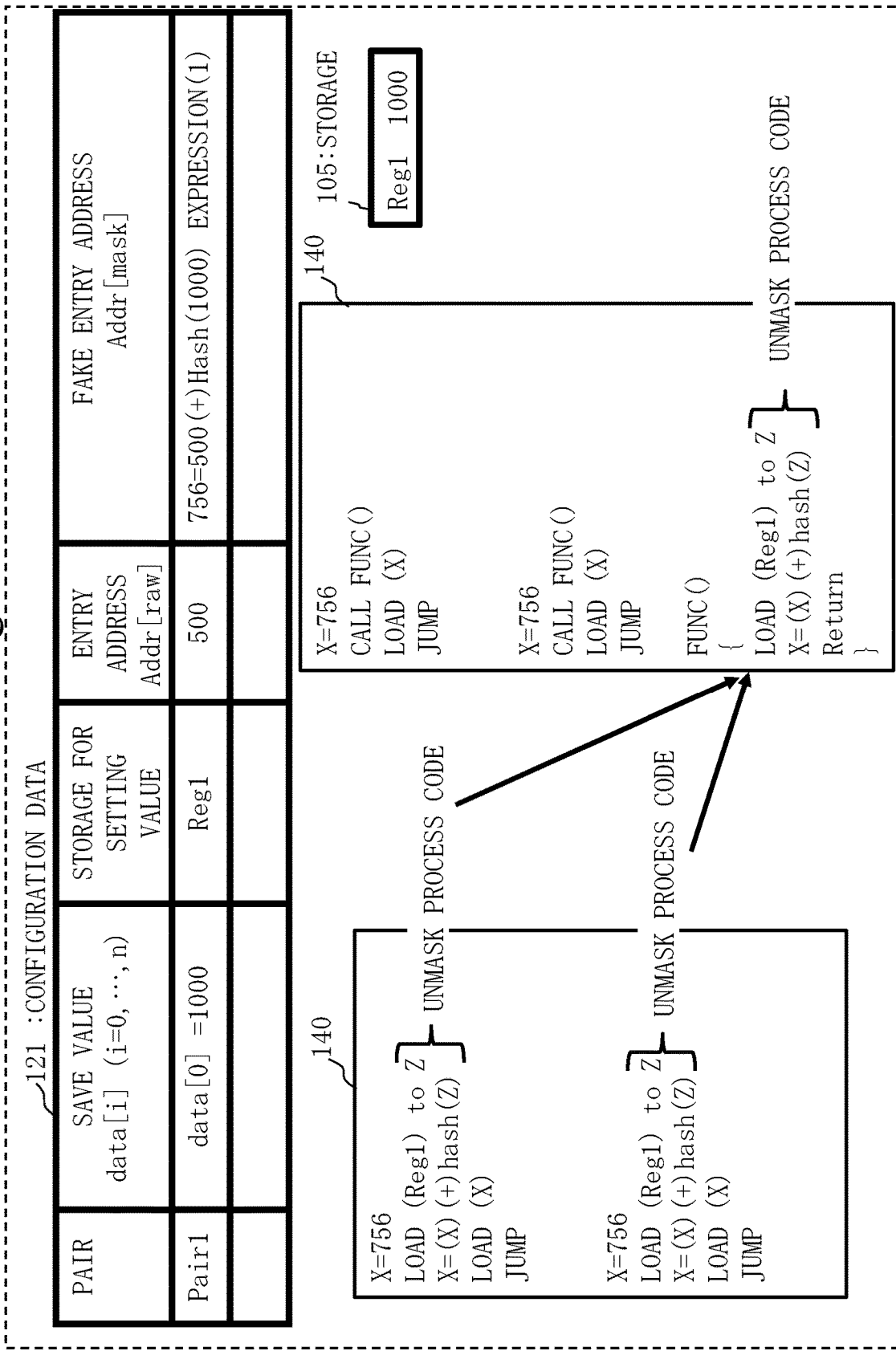
FIG. 10 is a drawing illustrating a deletion example in an unmask process according to Embodiment 2.

In FIG. 10, the fake entry address "756" of Pair1 is assumed to be a fake entry address of another application program P1 to which the application program 120 transitions. It is assumed that the application program 120 includes description for transition to the application program P1 at two locations. The setting value "1000" of the application program P1 is stored in Reg1. Two unmask process codes in FIG. 10 are the same as each other. The code generation unit 213 combines the two unmask process codes into one common routine FUNC and adds a CALL command for executing the common routine FUNC before a jump command.

Further, when all in the "storage for setting value" stored in the configuration data 121 are the same, corresponding unmask process codes are identical codes and the identical unmask process codes are redundant, resulting in an unnecessary process. Accordingly, the unmask process is deleted for the duplication in the "storage for setting value" specified in the configuration data.

The fault injection attack described in Non-Patent Literature 1 aims at resetting of access privileges stored in special registers of memory protection mechanisms. Alternatively, the fault injection attack causes an error in calculation processing of the processor 101 and skips resetting of access privileges to special registers of memory protection mechanisms at the time of application program switching.

When the application program 120 according to Embodiment 2 is applied to a TEE, a setting value is a value of access privilege for each application program and a storing destination of the value of access privilege is a special register included in a memory protection mechanism. This special register is common among a plurality of applications and thus, storage destinations of values of access privileges are the same. Accordingly, although unmask process codes are added to the program code 140 by the number of transitions to other application programs, the unmask process codes are the same codes with which values of access privileges are loaded from a common special register and unmasked. This process for removing redundant unmask process codes is the advantageous effect of step S250.

Figure 11:
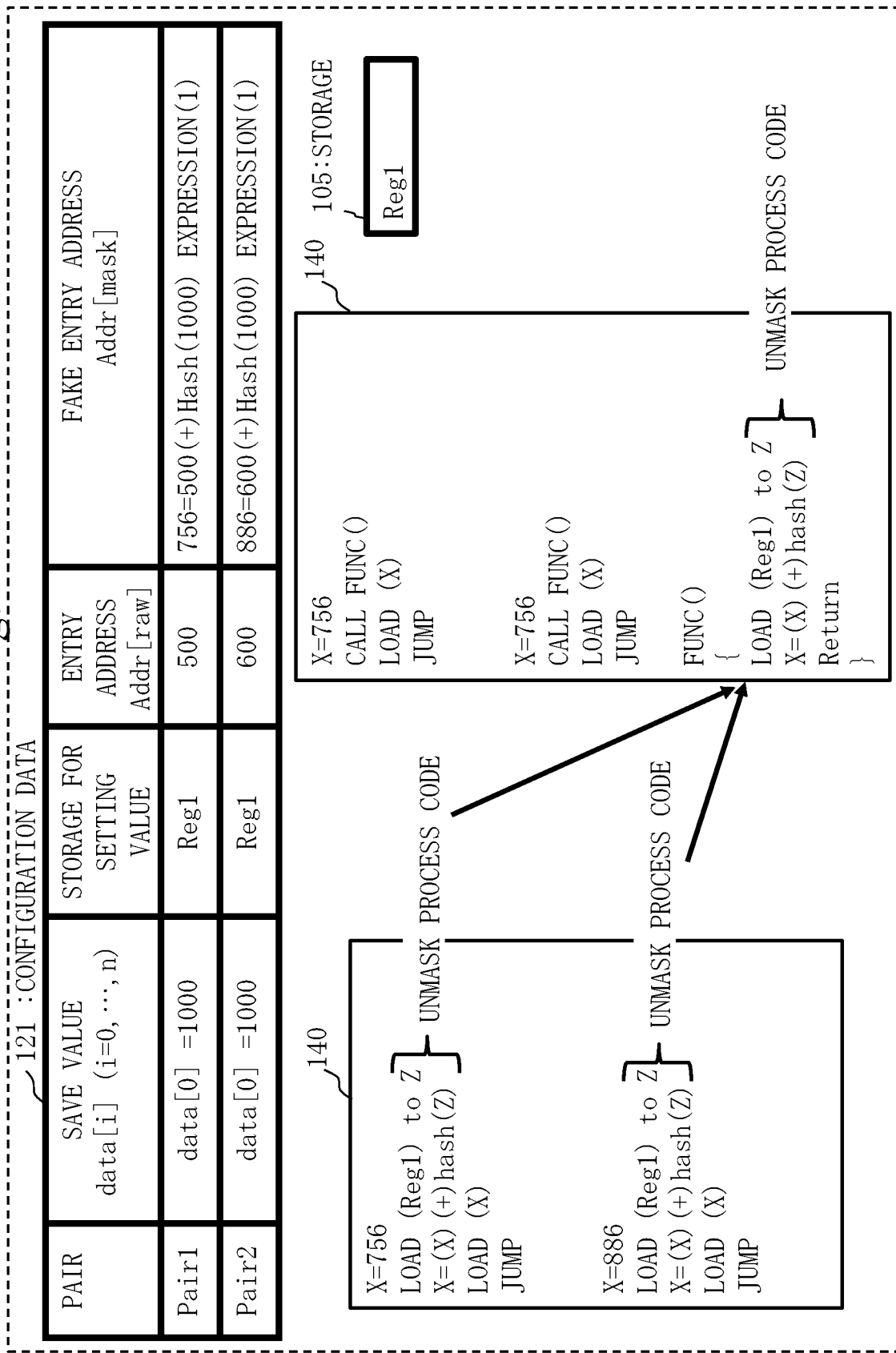
FIG. 11 is a drawing illustrating a deletion example in an unmask process according to Embodiment 2.

In FIG. 11, the special register included in the memory protection mechanism is assumed to be the storage "Reg1". The fake entry address "756" of Pair1 is assumed to be a fake entry address of another application program P1 to which the application program 120 transitions. The fake entry address "886" of Pair2 is assumed to be a fake entry address of still another application program P2 to which the application program 120 transitions. It is assumed that the application program 120 includes description for transition to the application program P1 and to the application program P2. Values of access privileges are stored in "Reg1" which is the special register included in the memory protection mechanism at the time of transition to the application program P1 and at the time of transition to the application program P2. Therefore, two unmask process codes of Pair1 and Pair2 are identical to each other. The code generation unit 213 combines the two unmask process codes into one common routine FUNC and adds a CALL command for executing the common routine FUNC before a jump command.

In step S260, the code generation unit 213 sets the program code 140 with countermeasures as the execution module 130 and transmits the execution module 130 to the outside via the input-output interface 104.

The execution module 130 is a program in which an entry address is replaced with a fake entry address.

The execution module 130 is a program that causes a computer to execute the following processes before access to the fake entry address.
1. A process for generating a new entry address which is obtained by loading a setting value from a storage and unmasking the fake entry address with the use of the setting value
2. A process for replacing the fake entry address with the new entry address The process of the transition specification unit 210 is step S242.

The process of the entry address masking unit 211 is step S210, step S220, step S230, step S241, and step S244.

The process of the unmask process addition unit 212 is step S245.

The process of the code generation unit 213 is step S250 and step S260.

Feature of Embodiment 2

The program processing device 200 according to Embodiment 2 is a program code generation device that performs the mask process for an entry address at the time of program generation and embeds an unmask process code in a program code.

The program processing device 200 includes a storage unit that stores the configuration data 121 in which a save value copied from a setting value, a storage storing the setting value, and an entry address used by the program code 140 are associated with each other.

The transition specification unit 210 specifies a transition command for transition to an entry address, based on the program code 140.

The entry address masking unit 211 executes the following mask process:
1. generating a fake entry address which is obtained by masking the entry address of the configuration data 121 with the use of a save value, and
2. replacing an entry address used by the program code 140 with the fake entry address.

The unmask process addition unit 212 adds the following unmask process codes immediately before the transition command specified by the transition specification unit 210.
1. A code for generating a new entry address which is obtained by loading a setting value from the storage 105 and unmasking the fake entry address with the use of the setting value.
2. An unmask process code for executing an unmask process using the new entry address.

Advantageous Effect of Embodiment 2

The program processing device 200 generates a code with countermeasures by applying countermeasures to the application program 120 based on the configuration data 121. Thus, the program processing device 200 can realize the same countermeasures as those of Embodiment 1 only by software and does not need the memory monitoring unit 111.

In addition to this, redundant unmask process codes are removed from the code with countermeasures.

Description of Another Example

The program code 140 handled by the program processing device 200 may be a program code to which the unmask process addition unit 212 can add an unmask process code.

The program code 140 may be an execution module code, a source code, a script code, an intermediate code, an HTML (Hyper Text Markup Language) text, or other codes.

Embodiment 3

In Embodiment 3, the points different from Embodiments 1 and 2 will be described.

Embodiment 3 will describe a configuration in which an entry address is not a memory address of a transition destination but a memory address of a reference destination.

Figure 12:
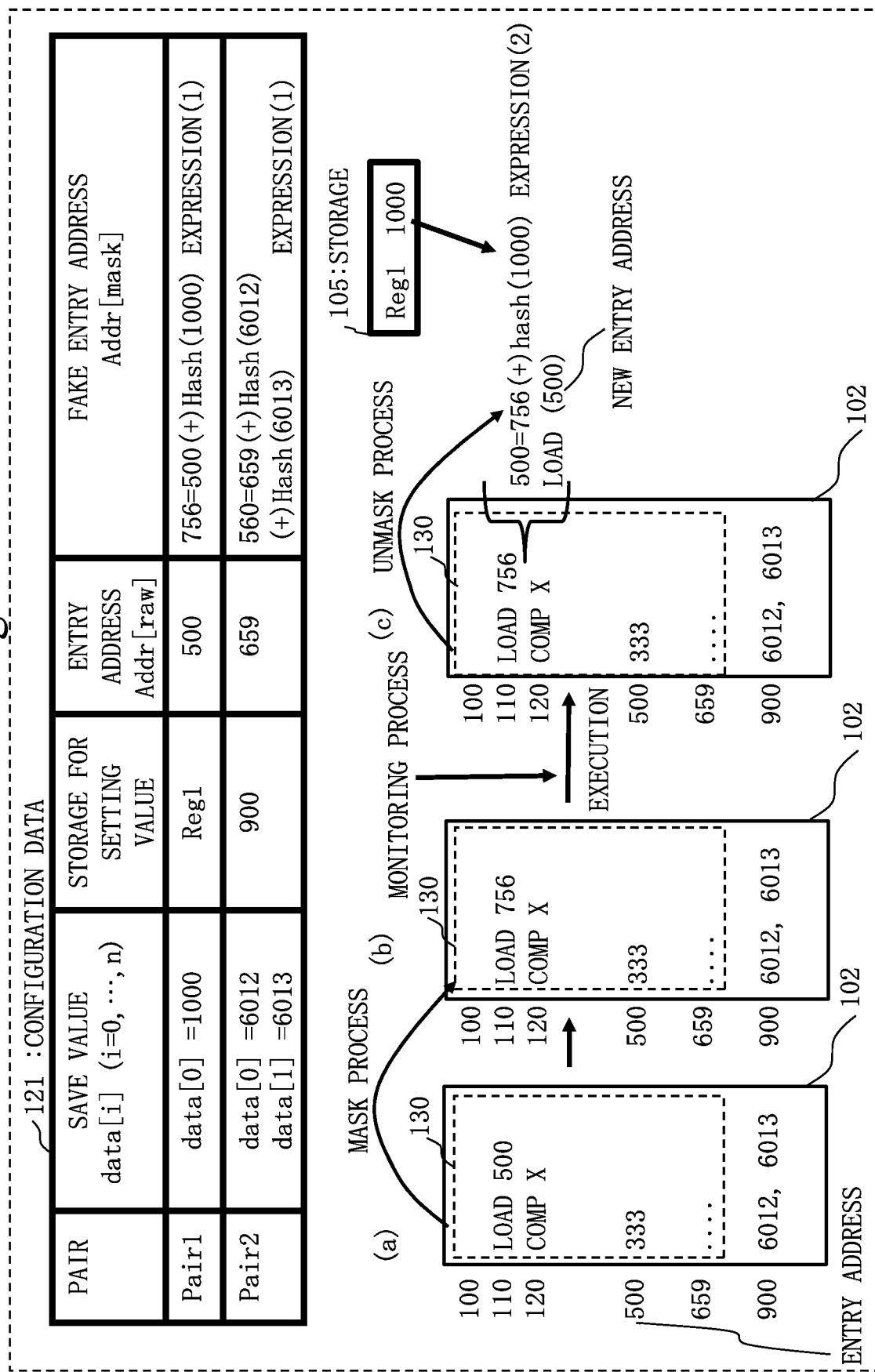
FIG. 12 is a drawing illustrating an entry address and a processing example according to Embodiment 3.

Embodiment 3 is assumed to use the configuration data 121 of FIG. 12. The configuration data 121 in FIG. 12 is the same as the configuration data 121 in FIG. 5.

Mask Process

As for the execution module 130 in (a) of FIG. 12, it is assumed that a value "333" is stored in the memory address 500, the value "333" of the memory address 500 is loaded in accordance with a load command at the memory address 110, and a value of the variable X and the value "333" are compared to each other in accordance with a comparison command at the memory address 120. The entry address masking unit 110 refers to an entry address of the configuration data 121 so as to detect a load command for referring to the entry address "500". Since the value "333" at the memory address 500 is loaded in accordance with the load command at the memory address 110, the entry address masking unit 110 detects the load command at the memory address 110.

The entry address masking unit 110 replaces the value "500" that is stored at the memory address 100 with the value "756" of the fake entry address ((b) of FIG. 12).

Monitoring Process

The processor 101 executes the application program 120 in (b) of FIG. 12. The memory monitoring unit 111 starts monitoring of the application program 120 in (b) of FIG. 12.

The memory monitoring unit 111 refers to the fake entry address of the configuration data 121 during the execution of the application program 120 so as to check whether the fake entry address is loaded onto the arithmetic register of the processor 101.

As for the application program 120 in (b) of FIG. 12, the memory monitoring unit 111 detects the loading of the value "756" of the fake entry address at the time of the execution of the memory address 110 and interrupts the execution of the application program 120.

Unmask Process

When the loading of the value "756" of the fake entry address is detected, the entry address unmasking unit 112 accesses to Reg1 corresponding to the value "756" of the fake entry address and loads the setting value "1000".

The entry address unmasking unit 112 calculates the new entry address 500=756(+)hash(1000). The entry address unmasking unit 112 executes the command "LOAD (500)" for loading a value of the new entry address 500.

In (c) of FIG. 12, the original entry address 500=the new entry address 500 is established. The application program 120 can compare a value "333" of the entry address 500 to the value of the variable X.

As described above, an entry address handled by the program processing device 100 may be not a memory address of a transition destination but a memory address of a reference destination.

An entry address handled by the program processing device 200 also may be not a memory address of a transition destination but a memory address of a reference destination.

According to Embodiment 3, unauthorized access to data stored at a memory address of a reference destination can be prevented by setting an entry address as a memory address of the reference destination.

Although a plurality of embodiments have been described above, some of these embodiments may be combined and implemented. Alternatively, parts of these embodiments may be combined and implemented.

REFERENCE SIGNS LIST

100: program processing device; 101: processor; 102: main storage memory; 103: storage device; 104: input-output interface; 105: storage; 110: entry address masking unit; 111: memory monitoring unit; 112: entry address unmasking unit; 120: application program; 121: configuration data; 122: countermeasure program; 130: execution module; 140: program code; 200: program processing device; 210: transition specification unit; 211: entry address masking unit; 212: unmask process addition unit; 213: code generation unit.

The invention claimed is:

1. A program processing device comprising processing circuitry to:
store configuration data in which a save value copied from a setting value, a storage storing the setting value, and an entry address are associated with each other,
execute a mask process in which a fake entry address is generated, the fake entry address being obtained by masking the entry address of the configuration data with a use of the save value, and an entry address, among a plurality of entry addresses used by an application program, having a same value as that of said entry address of the configuration data is replaced with the fake entry address, before execution of the application program,
determine whether the fake entry address is loaded during the execution of the application program, and
execute an unmask process in which a new entry address is generated, the new entry address being obtained by loading the setting value from the storage and unmasking the fake entry address with a use of the setting value, and the fake entry address is replaced with the new entry address, when the processing circuitry determines that the fake entry address is loaded.

2. The program processing device according to claim 1, wherein
the save value is a setting value that is set by a memory protection mechanism with respect to a memory, and
the storage is a register or a memory that is used by the memory protection mechanism.

3. The program processing device according to claim 1, wherein
the entry address is an entry address of an application running in a Trusted Execution Environment (TEE).

4. The program processing device according to claim 1, wherein
the mask process applies a hash function to the save value and then applies, to generate the fake entry address, an XOR (exclusive OR) operation to the obtained hash value and said entry address,
the unmask process applies the hash function to the setting value and then applies, to generate the new entry address, an XOR (eXclusive OR) operation to the obtained hash value and the fake entry address, and the mask process and the unmask process employ, as the hash function, any of a cryptographic hash function, a non-cryptographic hash function, and a universal hash function.

5. The program processing device according to claim 1, wherein
the mask process employs, to the save value, an encryption process using a private key and then applies, to generate the fake entry address, an XOR (exclusive OR) operation to the encrypted value and said entry address, and
the unmask process employs, to the setting value, the encryption process using the private key and then applies, to generate the new entry address, an XOR (exclusive OR) operation to the encrypted value and the fake entry address.

6. The program processing device according to claim 1, wherein
in the mask process, the entry address is encrypted by using the entry address as data and using the save value as a private key so as to generate the fake entry address, and
in the unmask process, the new entry address is decrypted by using the fake entry address as data and using the setting value as a private key.

7. A program processing device comprising
processing circuitry to:
store configuration data in which a save value copied from a setting value, a storage storing the setting value, and an entry address are associated with each other,
specify a transition command for transition to the entry address, based on a program code,
execute a mask process in which a fake entry address is generated, the fake entry address being obtained by masking the entry address of the configuration data with a use of the save value, and an entry address used by the program code is replaced with the fake entry address, and
add an unmask process code for executing an unmask process in which a new entry address is generated, the new entry address having a same value as that of said entry address of the configuration data, being obtained by loading the setting value from the storage and unmasking the fake entry address with a use of the setting value, and the new entry address is selected as an entry address being a destination of the transition command, immediately before the transition command specified.

8. The program processing device according to claim 7, wherein
the save value is a setting value that is set by a memory protection mechanism with respect to a memory, and
the storage is a register or a memory that is used by the memory protection mechanism.

9. The program processing device according to claim 7, wherein
the entry address is an entry address of an application running in a Trusted Execution Environment (TEE).

10. The program processing device according to claim 7, wherein
the mask process applies a hash function to the save value and then applies, to generate the fake entry address, an XOR (exclusive OR) operation to the obtained hash value and said entry address,
the unmask process applies the hash function to the setting value and then applies, to generate the new entry address, an XOR (exclusive OR) operation to the obtained hash value and the fake entry address, and
the mask process and the unmask process employ, as the hash function, any of a cryptographic hash function, a non-cryptographic hash function, and a universal hash function.

11. The program processing device according to claim 7, wherein
the mask process employs, to the save value, an encryption process using a private key and then applies, to generate the fake entry address, an XOR (exclusive OR) operation to the encrypted value and said entry address, and
the unmask process employs, to the setting value, the encryption process using the private key and then applies, to generate the new entry address, an XOR (exclusive OR) operation to the encrypted value and the fake entry address.

12. The program processing device according to claim 7, wherein
in the mask process, the entry address is encrypted by using the entry address as data and using the save value as a private key so as to generate the fake entry address, and
in the unmask process, the new entry address is decrypted by using the fake entry address as data and using the setting value as a private key.

13. The program processing device according to claim 7, wherein
the processing circuitry generates a program code by deleting a redundant unmask process code added.

14. A program processing method comprising:
storing configuration data in which a save value copied from a setting value, a storage storing the setting value, and an entry address are associated with each other;
executing a mask process in which a fake entry address is generated, the fake entry address being obtained by masking the entry address of the configuration data with a use of the save value, and an entry address, among a plurality of entry addresses used by an application program, having a same value as that of said entry address of the configuration data is replaced with the fake entry address, before execution of the application program;
determining whether the fake entry address is loaded during the execution of the application program; and
executing an unmask process in which a new entry address is generated, the new entry address having a same value as that of said entry address of the configuration data and being obtained by loading the setting value from the storage and unmasking the fake entry address with a use of the setting value, and the fake entry address is replaced with the new entry address, when it is determined that the fake entry address is loaded.

* * * * *